United States Patent
Wen et al.

(10) Patent No.: US 12,001,560 B2
(45) Date of Patent: Jun. 4, 2024

(54) METHOD AND SYSTEM FOR AVOIDING BOOT FAILURE FROM PLATFORM FIRMWARE RESILIENCE EXECUTION

(71) Applicant: Quanta Computer Inc., Taoyuan (TW)

(72) Inventors: Tzu-Heng Wen, Taoyuan (TW); Yen-Ping Tung, Taoyuan (TW); Wei-Hung Lin, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 215 days.

(21) Appl. No.: 17/513,548

(22) Filed: Oct. 28, 2021

(65) Prior Publication Data

US 2023/0133726 A1    May 4, 2023

(51) Int. Cl.
*G06F 9/00* (2018.01)
*G06F 3/06* (2006.01)
(Continued)

(52) U.S. Cl.
CPC .......... *G06F 21/572* (2013.01); *G06F 3/0622* (2013.01); *G06F 3/0655* (2013.01);
(Continued)

(58) Field of Classification Search
CPC ...... G06F 21/572; G06F 21/76; G06F 3/0622; G06F 3/0655; G06F 3/0679
See application file for complete search history.

(56) References Cited

U.S. PATENT DOCUMENTS 10,019,579 B2    7/2018   Young
10,489,338 B1 *  11/2019  Chien ................... G06F 9/4403
(Continued)

FOREIGN PATENT DOCUMENTS

EP    3522059 A1    8/2019
EP    3620916 A1    3/2020
(Continued)

OTHER PUBLICATIONS

TW Office Action for Application No. 111110793, dated Oct. 14, 2022, w/ First Office Action Summary.
(Continued)

*Primary Examiner* — Mohammed H Rehman
(74) *Attorney, Agent, or Firm* — NIXON PEABODY LLP

(57) ABSTRACT

A method and system to ensure correct firmware image execution in a computer system. The computer system has a processor executing a basic input/output system (BIOS) and a baseboard management controller (BMC). A first flash memory device is coupled to the processor storing a BIOS firmware image and a project name. A second flash memory device is coupled to the BMC storing a BMC firmware image and the project name. A programmable logic device is coupled to the first and second flash memory devices. The programmable logic device including a non-volatile memory storing a project name. The programmable logic device is configured to execute a Platform Firmware Resilience routine to compare the project name of the BIOS firmware image and the project name of the BMC firmware image with the stored project name before starting the BMC or executing the BIOS firmware image by the processor.

17 Claims, 7 Drawing Sheets

(51) Int. Cl.
*G06F 15/177* (2006.01)
*G06F 21/57* (2013.01)
*G06F 21/76* (2013.01)
*H04L 9/32* (2006.01)
*G06F 9/4401* (2018.01)

(52) U.S. Cl.
CPC ............ *G06F 3/0679* (2013.01); *G06F 21/76* (2013.01); *H04L 9/3247* (2013.01); *G06F 9/4416* (2013.01); *G06F 2221/033* (2013.01)

(56) References Cited

U.S. PATENT DOCUMENTS

| | | | |
|---|---|---|---|
| 11,238,159 B1* | 2/2022 | Clark-Lindh | G06F 21/572 |
| 2005/0158100 A1* | 7/2005 | Yamaguchi | G06F 8/65 |
| | | | 400/62 |
| 2005/0283596 A1 | 12/2005 | Chen et al. | |
| 2008/0072029 A1 | 3/2008 | Yu et al. | |
| 2012/0072896 A1* | 3/2012 | Watanabe | H04N 21/43632 |
| | | | 717/170 |
| 2013/0111457 A1* | 5/2013 | Culter | G06F 8/65 |
| | | | 717/171 |
| 2013/0125107 A1* | 5/2013 | Bandakka | H04L 67/10 |
| | | | 717/171 |
| 2017/0329596 A1* | 11/2017 | Butler | G06F 8/65 |
| 2018/0314507 A1* | 11/2018 | Chien | G06F 8/65 |
| 2019/0272155 A1* | 9/2019 | Chowdhary | H04L 67/12 |
| 2019/0278579 A1* | 9/2019 | Brian | G06F 8/65 |
| 2019/0339880 A1* | 11/2019 | Jiang | G06F 3/0659 |
| 2021/0297330 A1* | 9/2021 | Li | H04L 41/28 |
| 2023/0133270 A1* | 5/2023 | Jensonne | G06F 11/1469 |
| | | | 713/2 |

FOREIGN PATENT DOCUMENTS

| | | |
|---|---|---|
| TW | 200813775 A | 3/2008 |
| TW | 200844858 A | 11/2008 |
| TW | 201642173 A | 12/2016 |

OTHER PUBLICATIONS

TW Search Report for Application No. 111110793, dated Oct. 14, 2022, w/ First Office Action.

Extended European Search Report for EP Application No. 22164344.8, dated Sep. 16, 2022.

\* cited by examiner

Platform firmware manifest data structure

| | Name | Offset | Length (bytes) | Value/Comment |
|---|---|---|---|---|
| 310 | Tag | 0x000 | 4 | Magic number identifying PFM; value: 0x02B3CE1D |
| 312 | SVN | 0x004 | 1 | 0x00-0x40, security version number. SVN can be between 0-64. SVN higher than 64 is considered invalid. Incremented each time a release includes mitigation for security vulnerability. |
| 314 | BKC version | 0x005 | 1 | Best known configuration (BKC) version. This value is incremented in lock step for the PCH SPI image, the BMC SPI image release. Any combination of PCH and BMC SPI images with same BKC version must be validated together. |
| 316 | PFM revision | 0x006 | 2 | Offset 0x0006: Major revision of PFM Offset 0x0007: Minor revision of PFM |
| 318 | Reserved | 0x008 | 4 | Reserved |
| 320 | OEM specific data | 0x00C | 16 | OEM specific data (Project name) |
| 322 | Length | 0x01C | 4 | Size of PFM [in bytes] |
| 324 | PFM body | 0x020 | L | Continuous collection of PFM defined SPI regions and SMBus rules within the section of the FW storage (Active) |
| 326 | Padding | 0x020+L | M | Padding to nearest 128B boundary (should be all 0xFF) |

FIG. 3

METHOD AND SYSTEM FOR AVOIDING BOOT FAILURE FROM PLATFORM FIRMWARE RESILIENCE EXECUTION

TECHNICAL FIELD

The present disclosure relates generally to insuring proper firmware images during boot-up of a computer system. More particularly, aspects of this disclosure relate to a system that ensures that correct firmware is accessed for a hardware platform during the execution of the Firmware Platform Resilience (FPR).

BACKGROUND

Computer systems (e.g., desktop computers, blade servers, rack-mount servers, etc.) are employed in large numbers in various applications. Computer systems may perform general computing operations. A typical computer system, such as a server, generally includes hardware components such as processors, memory devices, network interface cards, power supplies, and other specialized hardware.

Servers are employed in large numbers for high demand applications such as network based systems or data centers. The emergence of the cloud for computing applications has increased the demand for data centers. Data centers have numerous servers that store data and run applications accessed by remotely-connected, computer device users. A typical data center has physical chassis structures with attendant power and communication connections. Each rack may hold multiple computing servers and storage servers. Each individual server has multiple identical hardware components such as processors, storage cards, network interface controllers, and the like.

Computer systems, such as servers, have a basic input/output system (BIOS) image that is typically stored in a Serial Peripheral Interface (SPI) EEPROM flash memory device and is executed by the processor during boot-up of the computer system. The BIOS is used to test basic inputs and outputs from the hardware components before booting up the computer system. The BIOS firmware (the BIOS image) is typically stored on the flash memory device on the motherboard.

Servers also use a baseboard management controller (BMC) to manage background operations such as power and cooling. The BMC collects data on the operation of the computer system in various logs according to firmware executed by the BMC. For example, data relating to different hardware components is stored in a system event log (SEL) that may also be written on a flash memory device along with the BMC firmware image. Thus, the embedded system firmware (BMC firmware) also saves system execution logs which are helpful for a vendor to analyze the system status when faults occur. Hence, a computer system relies on reliable non-volatile memory devices such as flash memory devices to store firmware images for basic processor and BMC operations.

Since servers are generally networked, malicious users may attempt attacks in various ways to prevent proper operation of servers. For example, permanent Denial of Service (DOS) attacks alter the server firmware to prevent the server from operating. This could result in data center downtimes measured in days and weeks, and potentially impacting millions of users. One method of conducting these permanent DOS attacks involves an attacker replacing the firmware image for critical systems such as the BIOS or the BMC in servers with a corrupt firmware image.

One solution to permanent DOS attacks is the Platform Firmware Resilience (PFR), which is an Intel® based routine that runs on a field programmable gate array (FPGA). The PFR monitors and filters malicious traffic on the system buses of a computer system. The PFR also verifies the integrity of platform firmware images before any firmware code is executed. The PFR may restore corrupted firmware automatically from a protected known recovery image. The PFR thus prevents the insertion of corrupt firmware, thereby preventing permanent DOS attacks.

When performing initial power-on for a hardware platform, the PFR enters a pre-boot environment, termed the T−1 mode. In the T−1 mode, the PFR performs authentication via signatures for critical firmware such as the BMC and BIOS firmware images. Both firmware images have signatures that are authenticated by a root key and a code signing key (CSK). The root key is a key designated as the primary, constant value for authentication that is used to sign other keys, forming the root of all key chains. This provides dual layer security, as the root key is used to access the CSK. Such keys may be generated by a neutral third party, such as AWS, for a fee. However, one issue is that original equipment manufacturers (OEMs) often use the same root key and CSK for multiple versions of firmware for different hardware platforms rather than spend additional fees for keys specific to each hardware platform. Generally, each different hardware platform is given a different project name for identification by the OEM of the platform. Thus incorrect firmware for a particular hardware platform may have the proper signature for authentication. When different hardware platforms, signed by the same root key and CSK, use the incorrect firmware image on the platform, the PFR can still perform authentication successfully and allow incorrect firmware images to be accessed. However, loading incorrect firmware images may prevent the hardware platform to be booted-up successfully. The same result may happen when using an incorrect project firmware image to update an existing firmware image.

Thus, there is a need for a routine that allows the PFR to properly identify correct firmware during the authentication process. There is also a need for a convenient method to provide the project name of a hardware platform to the PFR during a hardware provisioning process for a platform. There is also a need for using a project name to insure that firmware updates are correctly matched with a hardware platform.

SUMMARY

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

A disclosed example is a system to ensure execution of a correct firmware image in a computer system. The system includes a programmable logic device executing a Platform Firmware Resilience routine. The programmable logic device includes a non-volatile memory with an active area storing a project name. A flash memory stores a firmware image including a project name. The programmable logic device is configured to compare the project name of the firmware image and the project name stored in the non-volatile memory. The programmable logic device prevents access to the firmware image on the flash memory if the project names do not match.

A further implementation of the example system is an embodiment where the system includes a baseboard management controller and the firmware image is a BMC firmware image. Another implementation is where the programmable logic device is a field programmable gate array (FPGA). Another implementation is where the firmware image is a basic input/output system (BIOS) firmware image. Another implementation is where the programmable logic device authenticates a signature of the firmware image with a stored public key. Another implementation is where the project name of the firmware image is stored in a field of a Platform Firmware Manifest data structure stored in the flash memory. Another implementation is where the project name is stored in the non-volatile memory when the computer system is initially provisioned. Another implementation is where the programmable logic device compares a project name of a firmware update image with the stored project name, and prevents loading of the firmware update image if the project names do not match.

Another disclosed example is a method ensuring correct firmware images in a computer system. A project name is stored in a memory of a programmable logic device executing a Platform Firmware Resilience routine. The stored project name is compared with a project name of a firmware image. Access to the firmware image is prevented if the stored project name does not match the project name of the firmware image.

A further implementation of the example method is an embodiment where firmware image is a BMC firmware image executable by a baseboard management controller. Another implementation is where the programmable logic device is a field programmable gate array (FPGA). Another implementation is where the firmware image is a basic input/output system (BIOS) firmware image. Another implementation is where the method further includes authenticating a signature of the firmware image with a stored public key via the programmable logic device. Another implementation is where the project name of the firmware image is stored in a field of a Platform Firmware Manifest data structure. Another implementation is where the method further includes storing the project name during a provisioning process of the computer system. Another implementation is where the method further includes comparing a project name of a firmware update with the stored project name via the programmable logic device. The method prevents loading of the firmware update if the project names do not match.

Another disclosed example is a computer system having a processor executing a basic input/output system (BIOS) and a baseboard management controller (BMC). A first flash memory device is coupled to the processor and stores a BIOS firmware image and a project name of the BIOS firmware image. A second flash memory device is coupled to the BMC and stores a BMC firmware image and a project name of the BMC firmware image. A programmable logic device is coupled to the first and second flash memory devices. The programmable logic device including a non-volatile memory storing a project name. The programmable logic device is configured to execute a Platform Firmware Resilience routine to compare the project name of the BIOS firmware image and the project name of the BMC firmware image with the stored project name before starting the BMC or executing the BIOS firmware image by the processor.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of representative embodiments together with reference to the accompanying drawings. These drawings depict only representative embodiments, and are therefore not to be considered as limitations on the scope of the various embodiments or claims.

FIG. 3 is a table showing the platform firmware manifest data structure used to store the project name and accessible to the PFR, according to certain aspects of the present disclosure;

DETAILED DESCRIPTION

Figure 1:
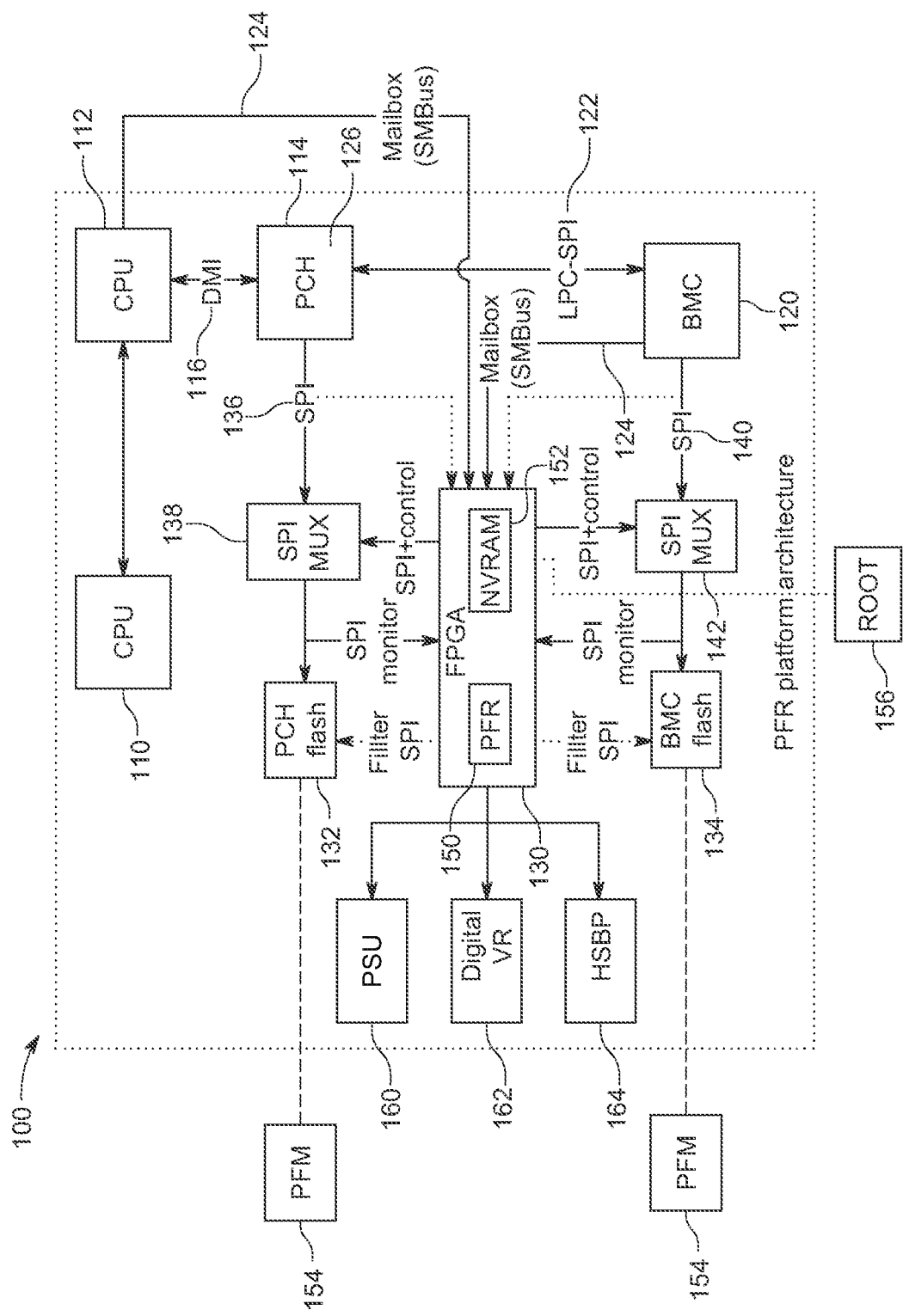
FIG. 1 is a block diagram of a computer system incorporating a modified PFR routine to insure correct firmware images, according to certain aspects of the present disclosure.

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

The present disclosure relates to a modified Platform Firmware Resilience (PFR) routine that incorporates the project name of specific hardware platforms to check firmware images for compatibility with the hardware platform. The example PFR routine performs a check of the project name to validate a correct firmware image when PFR is at T−1 stage as well as perform update firmware image validation before updating firmware. The example routine can avoid the PFR platform allowing incorrect firmware images, which causes boot failure, and thus enables the security functions performed by PFR to still be effective, but ensures proper firmware is provided.

FIG. 1 is a block diagram of the components of a hardware platform, such as a computer system 100, that runs a routine from the PFR to ensure the loading of correct firmware images form the computer system 100. The example routine ensures that an authenticated firmware image is a correct firmware image for the hardware platform. In this example, the computer system 100 is a server, but any suitable computer device can incorporate the principles disclosed herein. The computer system 100 has two central processing units (CPU) 110 and 112. Although only two CPUs are shown, additional CPUs may be supported by the computer system 100. Specialized functions may be performed by specialized processors such as a GPU mounted on a motherboard or on an expansion card in the computer system 100.

A platform controller hub (PCH) 114 facilitates communication between the CPUs 110 and 112 and other hardware components, such as serial advanced technology attachment (SATA) devices, Open Compute Project (OCP) devices, and USB devices. The SATA devices may include hard disk drives (HDD)s. Alternatively, other memory storage devices such as solid state drives (SSD)s may be used. Other hardware components such as PCIe devices may be directly accessed by the CPUs 110 or 112 through expansion slots (not shown). The additional PCIe devices may include network interface cards (NIC), redundant array of inexpensive disks (RAID) cards, and processor cards such as graphic processing unit (GPU) cards. A direct media interface (DMI) bus 116 allows communication between the CPUs 110 and 112 and the PCH 114.

A baseboard management controller (BMC) 120 manages operations, such as power management and thermal management, for the computer system 100. In this example, a low pin count/enhanced serial peripheral interface (LPC/eSPI) bus 122 allows communication between the PCH 114 and the BMC 120. A separate system management (SM) bus 124 allows management commands to be exchanged between the CPUs 110 and 112, the BMC 120, and a field programmable gate array (FPGA) 130. A flash memory device 132 stores a basic input output system (BIOS) firmware image. A separate flash memory device 134 stores a BMC firmware image. In this example, the PCH 114 may access the flash memory 132 via a Serial Peripheral Interface (SPI) 136 coupled to a multiplexer 138. Similarly, the BMC 120 may access the flash memory 134 via another SPI 140 through a multiplexer 142.

The blocks in the flash memory device 132 facilitate the start-up routine for the computer system 100. The PCH 114 facilitates loading the BIOS image stored on the flash memory device 132 for boot-up of the computer system 100. In this example, the flash memory device 134 stores a BMC firmware image for operation of the BMC 120. The BMC 120 executes the BMC firmware image that allows monitoring and control of hardware components in the computer system 100.

The FPGA 130 includes pins that allow control of the multiplexers 138 and 142 to allow access by the PCH 114 and BMC 120 to respective flash memories 132 and 134 through the SPIs 136 and 140. In this example, the hardware of the FPGA 130 is programmed to perform a PFR routine 150. The FPGA 130 includes an internal non-volatile random access memory (NVRAM) 152 for storage of data supporting the PFR routine such as the project name associated with the computer system 100. In this example, both the flash memories 132 and 134 store a platform firmware manifest (PFM) structure 154 that includes the project name associated with firmware images stored on the respective flash memories 132 and 134. During the provisioning process, the hardware of the FPGA 130 is provided with a root key hash 156 from the BIOS. The root key hash 156 is stored in the NVRAM 152. A CSK is signed by the root key for authenticating firmware and flash memories during the execution of the PFR routine.

The FPGA 130 also is coupled to a power supply unit (PSU) 160, a digital voltage regulator (VR) 162, and a hot swap backplane (HSBP) 164. After the authentication of firmware images from the PFR routine, the FPGA 130 allows access to these components by the BMC 120. The FPGA 130 then filters commands to and from the BMC 120 during operation of the computer system 100.

In this example, the FPGA 130 serves as a Root of Trust (RoT) to enable the firmware security functions of the PFR 150. The RoT includes features that assist the PFR to perform security functions, such as preventing loading or executing of unauthorized code or designs; preventing disruptive operations attempted by software; or preventing execution of older code or designs with known bugs or vulnerabilities. The PFR 150 enables the BMC 120 to revoke authorization to provide secure operation of the computer system 100.

In this example, the FPGA 130 executes the PFR 150 for purposes of authenticating stored firmware images and preventing corrupt firmware image downloads to the system 100. In this example, the FPGA 130 is an Intel Max 10 FPGA specifically programmed to execute the PFR 150. However, any programmable controller or other FPGA may be used to execute security functions.

In this example, the public and private root key and CSK are created by a third party vendor such as AWS. Alternatively, keys may be created using a Hardware Security Module (HSM) or OpenSSL. One of the keys is designated as a root key, and another key is designated as a code signing key (CSK). These keys are asymmetric keys, meaning they consist of an underlying pair of public and private keys. The CSK key is used to create signatures over objects such as firmware images distributed by the manufacturer of the hardware platform that can be verified with the corresponding CSK key that is signed by the root key.

Figure 2:
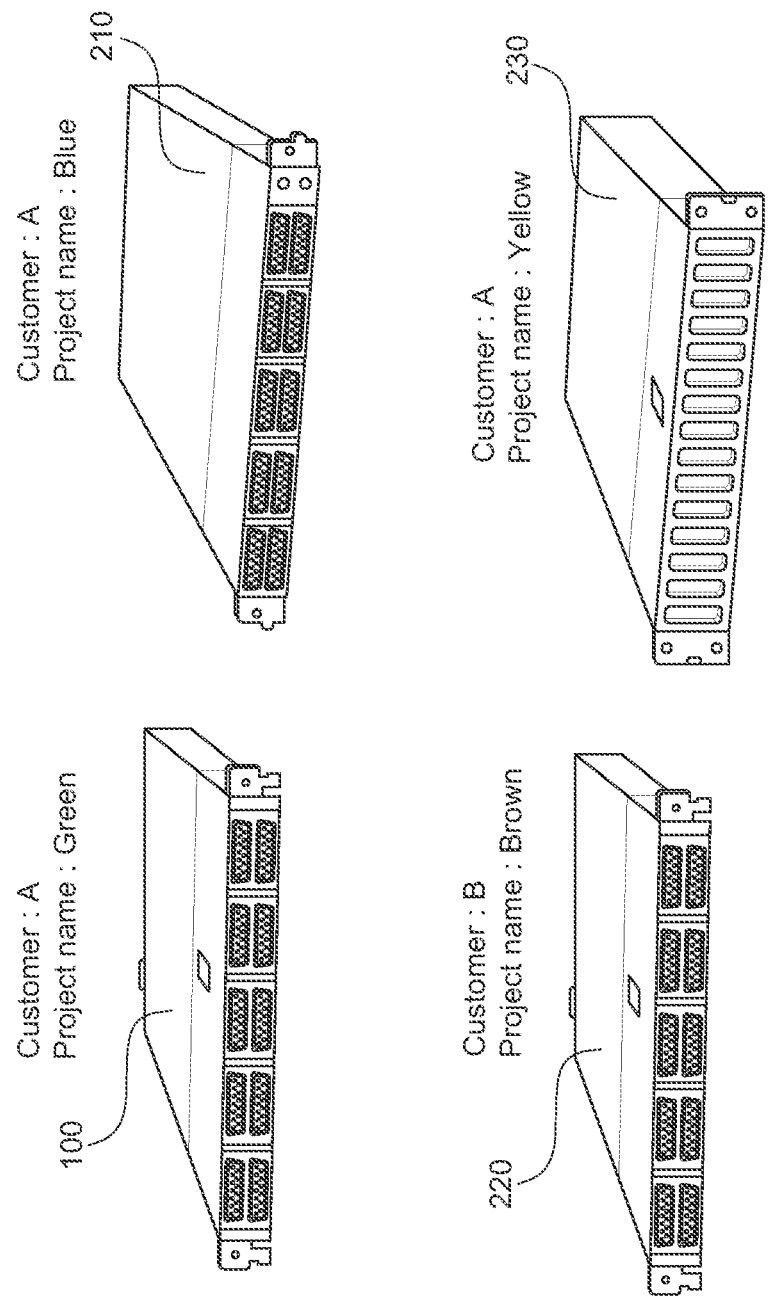
FIG. 2 is a diagram of different platforms including the computer system in FIG. 1 having project names but the same keys for authentication, according to certain aspects of the present disclosure.

FIG. 2 shows an example series of hardware platforms produced by an original equipment manufacturer (OEM). In this example, the OEM has designated different project names for each hardware platform. Thus, the computer system 100 is a first type of hardware platform with 12 expansion cards that is designated with a project name of "Green." A second hardware platform 210 with 10 expansion cards is designated with a project name of "Blue." A third hardware platform 220 with 12 expansion cards is designated with a project name of "Brown." A fourth hardware platform 230 with 20 expansion cards is designated with a project name of "Yellow." Each of the hardware platforms in FIG. 2 have the same root key and CSK for purposes of authentication by respective FPGAs running the known PFR. However, since all the firmware images for the different platforms 100, 210, 220 and 230 also have the same signature, incorrect firmware images may be authenticated and loaded. For example, firmware images for the hardware platform 210 could be erroneously loaded into the hardware platform 230. Such firmware images would have the proper signature, but may result in crashing the hardware platform 230 on boot-up because they are incompatible with the hardware platform 230.

In the computer system 100, the public key of the root key and the CSK are used to create signatures by the OEM who has exclusive possession of the private key. Signatures are created for the BMC firmware image stored on the flash memory 134 and the BIOS firmware image stored in the flash memory 132 and any other firmware images. As explained above, the FPGA 130 stores the root key hash 156. The root key hash 156 is used to sign the CSK to authenticate the signatures of any firmware images. In this example, the PFR 150 also receives provisioning data from the provisioning routine of the hardware platform. The provisioning data includes the project name.

After provisioning, a BMC and BIOS firmware build process is performed. During this process, the Platform Firmware Manifest (PFM) data structures 154 are created and stored in the flash memories 132 and 134. Data values are stored for the PFM data structure 154 in the flash memory that stores the firmware image. For example, the PFM data structure 154 stored in the flash memory 132 includes the project name data associated with the BIOS image stored in the flash memory 132. Similarly, the PFM data structure 154 stored in the flash memory 134 includes the project name data associated with the BMC firmware image stored in the flash memory 134. In this example, the PFM data structures 154 should contain a project name such as "Green," unique to the hardware platform (computer system 100) if the corresponding firmware images are correct.

The stored project name in the NVRAM 152 is used by the PFR 150 to check whether the project name stored in the PFM data structure 154 associated with the stored firmware images are correct for the hardware platform. FIG. 3 is a table 300 showing the PFM data structure 154 in FIG. 1 used by the example routine. The table 300 of the PFM data structure 154 includes a tag field 310, a security version number field 312, a best known configuration version field 314, a PFM revision field 316, a reserved field 318, an OEM specific data field 320, a length field 322, a PFM body field 324, and a padding field 326. The values for the fields of the PFM data structure 154 are written into the data structure 154 during the BMC and BIOS firmware build process. In this example, the OEM specific data field 320 includes the project name designated by the OEM for the hardware platform. Thus, the project name "Green" is written in the data field 320 for the computer system 100 for firmware images that are associated with the computer system 100.

After the provisioning process, the PFR 150 is executed by the FPGA 130 during the start-up of the hardware platform such as the computer system 100. When PFR 150 is at the T−1 stage, the PFR 150 will access the flash memories 132 and 134 in FIG. 1 to perform authentication for the active and recovery region of each flash memory 132 and 134 by authenticating the signatures created from the public keys of the root key and the CSK pairs. If the authentication is successful, all firmware images may be loaded from the flash memories 132 and 134. In this example, the PFR 150 also validates the project name associated with the firmware image, which is stored in the OEM specific data field of the PFM data structure 154 within the active region of the flash memory, before allowing loading of the firmware image. If the project name of the firmware image from the PFM data structure 154 matches the stored project name in the NVRAM 152, the PFR 150 will continue the authentication routine for the computer system 100 as the firmware image is correct. If the project name of the firmware image does not match the project name stored in the NVRAM 152, the PFR 150 will hold access to the respective flash memory storing the incorrect firmware image and prevent the operating system from booting.

Similarly, when updating firmware images, the BMC 120 or the BIOS will send a request for updating the respective firmware image. The FPGA 130 will receive the request and authenticate the updated firmware image. The PFR 150 will authenticate the flash memories and the updated firmware image. The PFR 150 will also validate the project name associated with the updated firmware image with the project name stored in the NVRAM 152. If the project name is correct, the PFR 150 will continue the update flow, and allow the updated firmware image to be accessed in the flash memory. The incorrect project name will cause the PFR to reject this update. In this manner, the example routine ensures that the correct firmware images are loaded to allow correct operation of the computer system 100.

Figure 4:
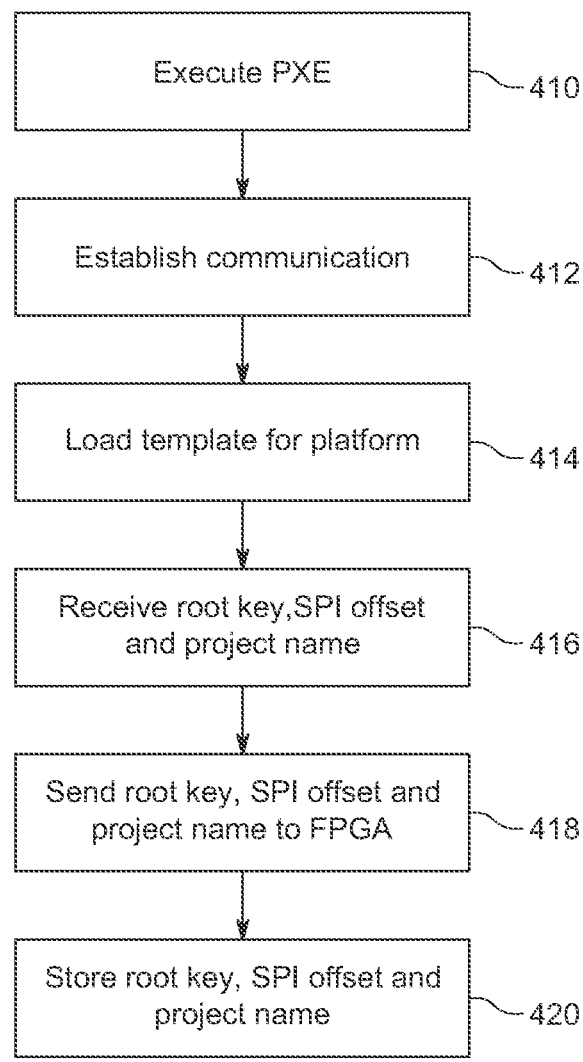
FIG. 4 is a flow diagram of a provision routine executed by the BIOS to set up hardware and provide the project name to the PFR, according to certain aspects of the present disclosure.

FIG. 4 shows a flow diagram of the provisioning process to write the project name to the PFM data structure 154 in FIG. 1. The BIOS initiates the provisioning process through a pre-boot execution environment (PXE) routine (410). Communications are established with an external server via the PXE (412). A template is loaded for provisioning components on the hardware platform (414). The root key hash 156, SPI offset of active, recovery and staging regions and the project name are received by the BIOS (416). The BIOS uses the SPI offset to determine the location of the active recovery and staging regions for a flash memory. The BIOS sends the root key hash, SPI offset of active, recovery and staging regions, and the project name to the FPGA 130 (418). The PFR 150 then stores the root key hash, SPI offset of active, recovery and staging regions, and the project name (420). In this example, the root key hash is programmed into the FPGA 130, while the root key hash, SPI offset of active, recovery and staging regions, and the project name are stored in NVRAM 152.

Figure 5A:
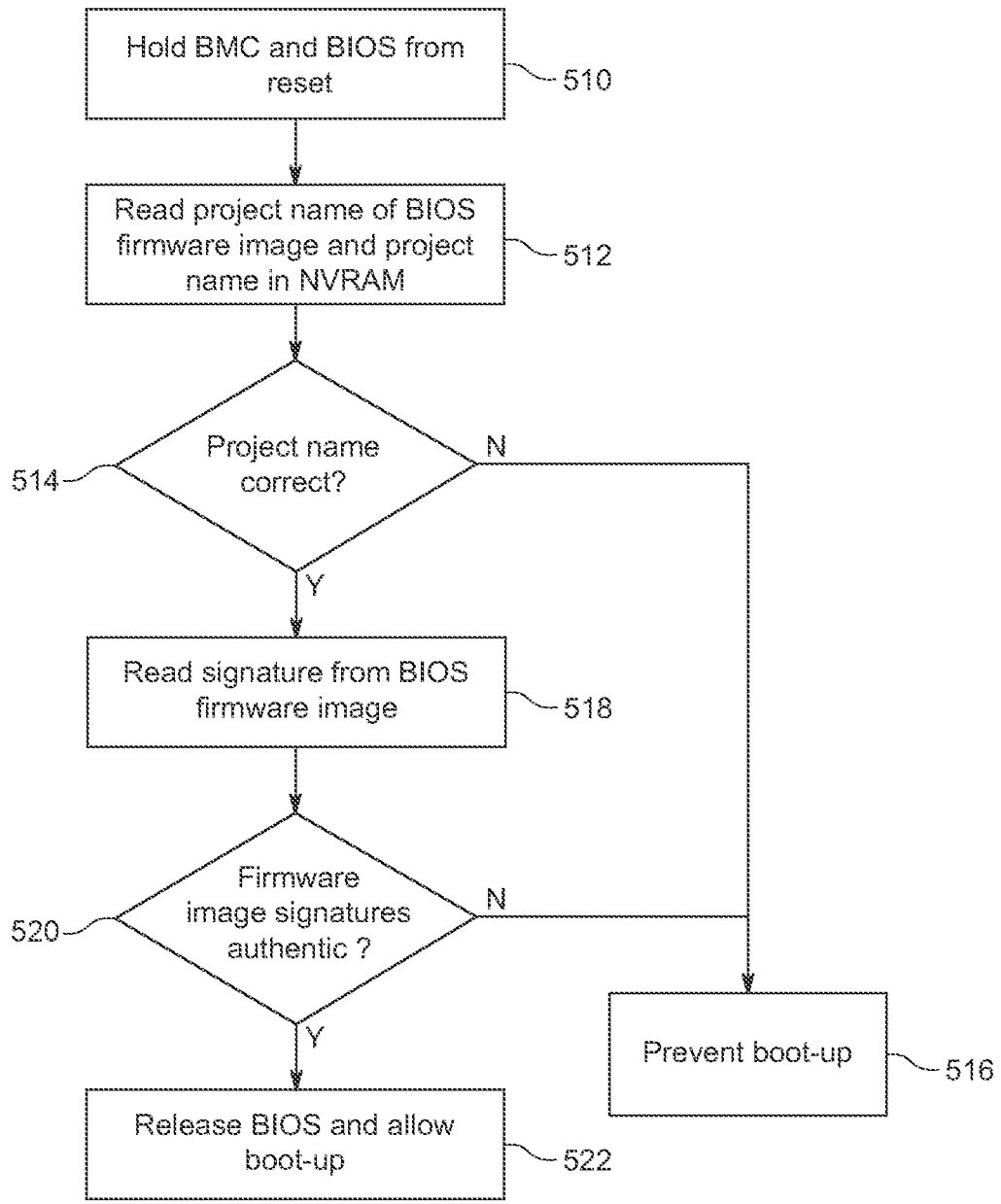
FIG. 5A is a flow diagram of an example authentication routine for a BIOS image that insures the loading of a correct BIOS firmware image.

FIG. 5A shows the PFR routine of authenticating BIOS firmware image using the project name associated with the hardware platform. The PFR 150 in FIG. 1 first holds the BMC 120 and the BIOS from resetting (510). The PFR 150 reads a pointer to the project name stored in the NVRAM 152 to read the stored project name and reads the project name stored in the PFM data structure 154 in the flash memory 132. (512). The PFR 150 then compares the stored project name to the project name of the BIOS firmware image stored in the PFM data structure 154 on the flash memory 132. The PFR 150 determines whether the project name is correct by determining whether the project name of the BIOS firmware image matches the stored project name (514). If the project name of the BIOS firmware image is incorrect, the PFR 150 will stop the boot-up (516). If the project name is correct, the PFR 150 reads the signature of the BIOS firmware image (518). The PFR 150 uses the root key hash 156 to determine whether the signature of the BIOS firmware image is authentic (520). If the signature is not authenticated (520), the PFR 150 prevents access to the flash memory 132 and prevents boot-up (516). If the signature is authenticated from the root key hash, the PFR 150 then releases the BIOS and allows the BIOS to reset to begin the boot-up process (522).

Figure 5B:
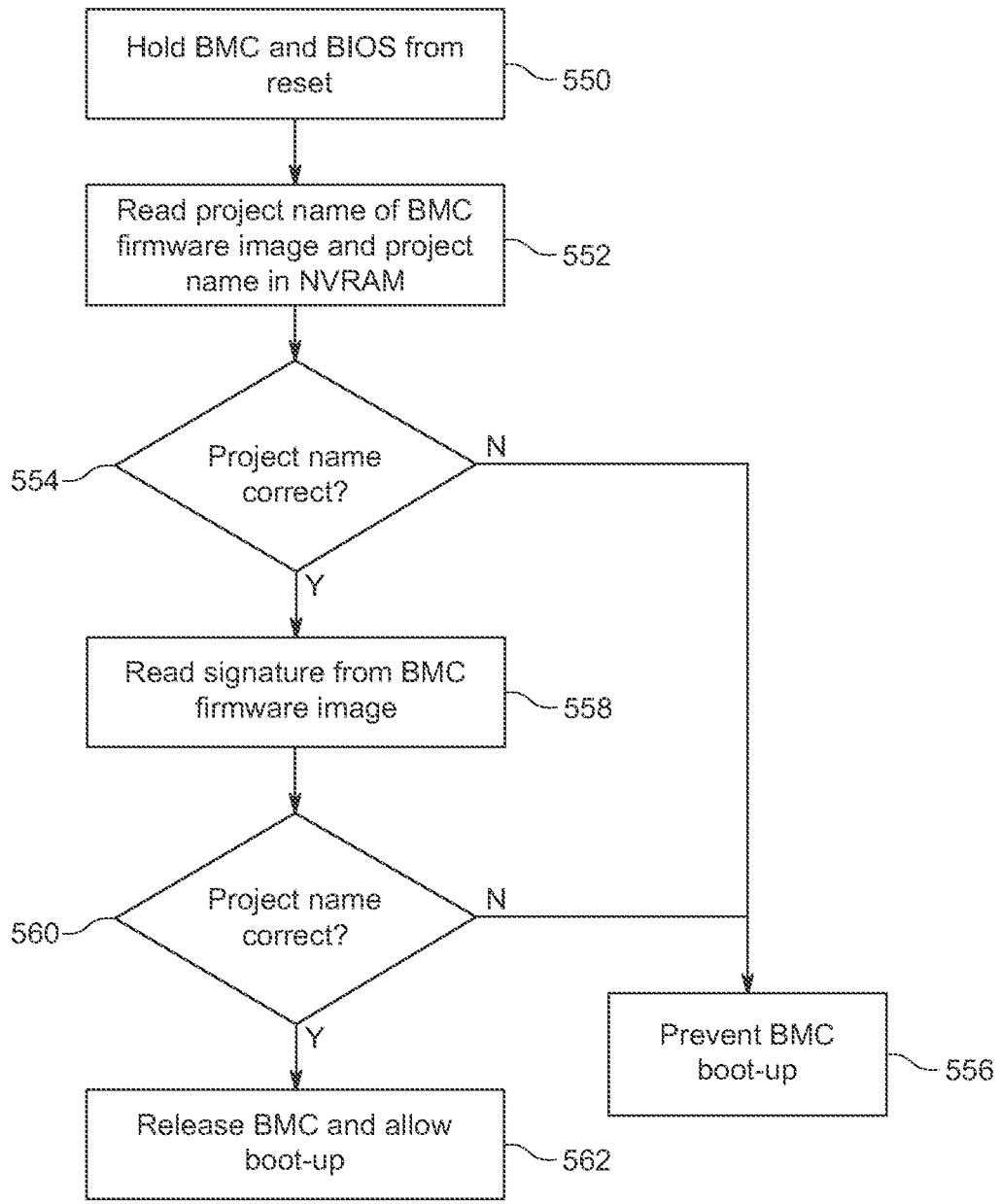
FIG. 5B is a flow diagram of an example authentication routine for a BMC firmware image insures the loading of a correct BMC firmware image.

FIG. 5B shows the PFR routine of authenticating a BMC firmware image using the project name associated with the hardware platform. The PFR 150 in FIG. 1 first holds the BMC 120 and the BIOS from resetting (550). The PFR 150 reads a pointer to the project name in the NVRAM 152 to read the stored project name and reads the project name stored in the PFM data structure 154 in the flash memory 134 (552). The PFR 150 then compares the project name to the project name of the BMC firmware image stored in the PFM data structure 154 on the flash memory 134. The PFR 150 determines whether the project name is correct by determining whether the project name of the BMC firmware image matches the stored project name (554). If the project name of the BMC firmware image is incorrect, the PFR 150 will stop the boot-up of the BMC 120 (556). If the project name is correct, the PFR 150 reads the signature of the BMC firmware image (558). The PFR 150 uses the root key hash 156 to determine whether the signature of the BMC firmware image is authentic (560). If the signature is not authenticated (560), the PFR prevents access to the flash memory 134 and prevents boot-up (556). If the signature is authenticated from the root key hash, the PFR 150 then releases the BMC 120 and allows the BMC 120 to reset to begin the boot-up process (562).

Figure 6:
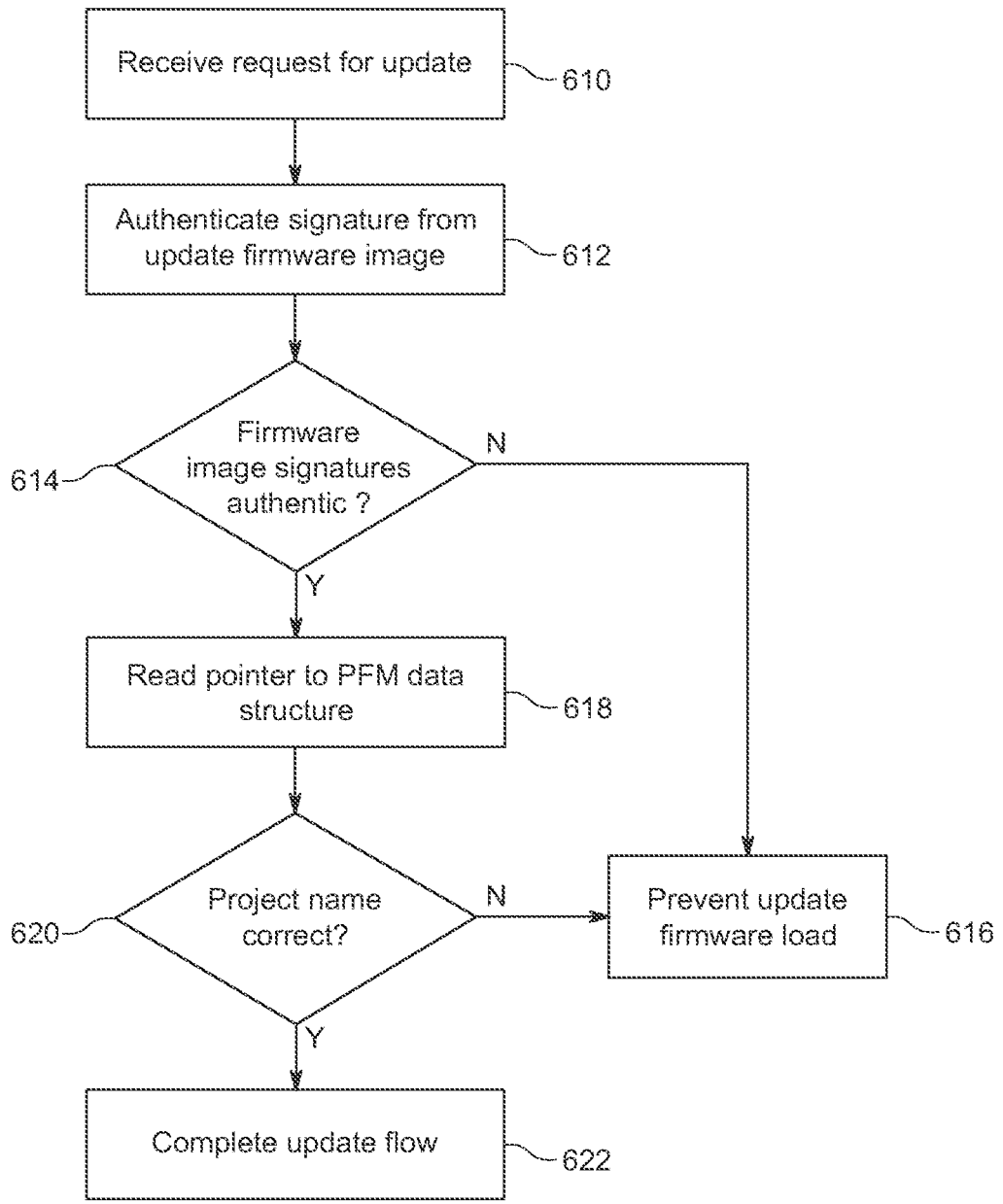
FIG. 6 is a flow diagram of the example routine for authenticating updated firmware images, according to certain aspects of the present disclosure.

FIG. 6 shows a routine to update a firmware image by executing the PFR 150 in FIG. 1 to access the project name to insure proper system operation. The PFR 150 will receive a request by the BMC 120 or BIOS for access to one of the flash memories 132 or 134 in FIG. 1 for an external updated firmware image (610). The PFR 150 will authenticate the signature of the received update firmware image using the root key hash (612). The PFR 150 will then determine if the signature of the update firmware image is authentic (614). If the update firmware image is not authenticated (614), the PFR 150 returns a reject firmware and prevents loading of the firmware image update (616). If the authentication is successful, the PFR 150 will read a pointer to the project name to read the project name from the NVRAM 152 (618). The PFR 150 will read the stored project name from NVRAM 152 and compare it to the project name of the received firmware image to determine if the project name of the firmware image is correct (620). If the project name is correct, the PFR 150 continues the update flow (622). If the project name is incorrect, the PFR 150 returns a reject firmware and prevents loading of the firmware image update (616).

The above described routines in FIGS. 4-6 are representative of example machine-readable instructions for the BIOS to supply the FPGA 130 in FIG. 2 with the project name and check either firmware images or updated firmware images to ensure proper firmware is accessed for the computer system. In this example, the machine-readable instructions comprise an algorithm for execution by: (a) a processor; (b) a controller; and/or (c) one or more other suitable processing device(s). The algorithm may be embodied in software stored on tangible media such as flash memory, CD-ROM, floppy disk, hard drive, digital video (versatile) disk (DVD), or other memory devices. However, persons of ordinary skill in the art will readily appreciate that the entire algorithm and/or parts thereof can, alternatively, be executed by a device other than a processor and/or embodied in firmware or dedicated hardware in a well-known manner (e.g., it may be implemented by an application specific integrated circuit (ASIC), a programmable logic device (PLD), a field programmable logic device (FPLD), a field programmable gate array (FPGA), discrete logic device, etc.). For example, any or all of the components of the routines can be implemented by software, hardware, and/or firmware. Also, some or all of the machine-readable instructions represented by the flowcharts may be implemented manually. Further, although the example routine is described herein, persons of ordinary skill in the art will readily appreciate that many other methods of implementing the example machine-readable instructions may alternatively be used.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present disclosure have been described above, it should be understood that they have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above described embodiments. Rather, the scope of the disclosure should be defined in accordance with the following claims and their equivalents.

What is claimed is:
1. A system to ensure execution of a correct firmware image in a computer system, the system comprising:
   a flash memory for storing a firmware image including a project name;
   a processor executing the firmware image; and a programmable logic device executing a Platform Firmware Resilience routine separate from the firmware image, the routine monitoring and filtering malicious traffic on a system bus coupled to the processor, the programmable logic device including a non-volatile memory with an active area storing a project name, wherein the programmable logic device is configured to compare the project name of the firmware image and the project name stored in the non-volatile memory, and prevent access by the processor to the firmware image on the flash memory if the project names do not match, and wherein the programmable logic device is further configured to receive a request for a firmware update after booting of the processor, compare a project name of a firmware update with the stored project name, and prevent loading of the firmware update if the project name of the firmware update and the stored project name do not match while allowing the processor to continue to function.

2. The system of claim 1, further comprising a baseboard management controller (BMC), wherein the firmware image is a BMC firmware image.

3. The system of claim 1, wherein the programmable logic device is a field programmable gate array (FPGA).

4. The system of claim 1, wherein the firmware image is a basic input/output system (BIOS) firmware image.

5. The system of claim 1, wherein the programmable logic device is further configured to authenticate a signature of the firmware image with a stored public key.

6. The system of claim 1, wherein the project name of the firmware image is stored in a field of a Platform Firmware Manifest data structure stored in the flash memory.

7. The system of claim 1, wherein the project name is stored in the non-volatile memory when the computer system is initially provisioned.

8. The system of claim 1, further comprising a multiplexer controlled by the programmable logic device is coupled between the processor and the flash memory, wherein the programmable logic device prevents access by the processor to the firmware image on the flash memory by controlling the multiplexer.

9. A method of ensuring correct firmware images in a computer system, the method comprising:
storing a project name in a memory of a programmable logic device executing a Platform Firmware Resilience routine separate from the firmware image, the routine monitoring and filtering malicious traffic on a system bus coupled to a processor;
comparing the stored project name with a project name of a firmware image executable by the processor;
preventing access by the processor to the firmware image if the stored project name does not match the project name of the firmware image;
receiving a request for a firmware update after booting of the processor;
comparing a project name of a firmware update with the stored project name; and
preventing loading of the firmware update if the project name of the firmware update and the stored project name do not match while allowing the processor to continue to function.

10. The method of claim 9, wherein the firmware image is a BMC firmware image executable by a baseboard management controller.

11. The method of claim 9, wherein the programmable logic device is a field programmable gate array (FPGA).

12. The method of claim 9, wherein the firmware image is a basic input/output system (BIOS) firmware image.

13. The method of claim 9, further comprising authenticating a signature of the firmware image with a stored public key via the programmable logic device.

14. The method of claim 9, wherein the project name of the firmware image is stored in a field of a Platform Firmware Manifest data structure.

15. The method of claim 9, further comprising storing the project name during a provisioning process of the computer system.

16. The method of claim 9, wherein a multiplexer controlled by the programmable logic device is coupled between the processor and a flash memory storing the firmware image, wherein the programmable logic device prevents access by the processor to the firmware image on the flash memory by controlling the multiplexer.

17. A computer system comprising:
a processor executing a basic input/output system (BIOS);
a baseboard management controller (BMC);
a first flash memory device coupled to the processor, the first flash memory storing a BIOS firmware image and a project name of the BIOS firmware image;
a second flash memory device coupled to the BMC, the second flash memory storing a BMC firmware image and a project name of the BMC firmware image; and
a programmable logic device coupled to the first and second flash memory devices, the programmable logic device including a non-volatile memory storing a project name and configured to execute a Platform Firmware Resilience routine separate from the BIOS firmware image and the BIOS firmware image, the routine monitoring and filtering malicious traffic on a system bus coupled to the processor and the BMC, to compare the project name associated with the BIOS firmware image and the project name associated with the BMC firmware image with the project name stored in the non-volatile memory before starting the BMC or executing the BIOS firmware image by the processor, and wherein the programmable logic device is further configured to receive a request for a firmware update after booting of the processor, compare a project name of a firmware update with the stored project name, and prevent loading of the firmware update if the project name of the firmware update and the stored project name do not match while allowing the processor to continue to function.

* * * * *